United States Patent

Schwind et al.

[11] Patent Number: 5,962,131
[45] Date of Patent: Oct. 5, 1999

[54] PROCESS FOR PROCESSING POLYMER MIXTURES TO FILAMENTS

[75] Inventors: Helmut Schwind, Hanau; Wolfgang Janas, Geiselbach; Klaus Dorn, Hanau; Peter Kempf, Rodenbach; Dietmar Wandel, Hanau; Joachim Cziollek, Mainz; Ulrich Thiele, Bruchköbel; Alexander Klein, Ingelheim; Heinz-Dieter Schumann, Maintal, all of Germany

[73] Assignee: Degussa Aktiengesellschaft, Frankfurt, Germany

[21] Appl. No.: 09/129,624

[22] Filed: Aug. 5, 1998

[30] Foreign Application Priority Data

Aug. 5, 1997 [DE] Germany .......................... 197 33 799
Oct. 30, 1997 [DE] Germany .......................... 197 47 867

[51] Int. Cl.$^6$ ................ D02G 3/00; C08F 20/00
[52] U.S. Cl. ................ 428/364; 525/7.1; 525/8; 525/10; 525/165; 525/242; 525/244; 525/329.7; 525/330.3; 525/333.3; 525/437; 525/445; 264/176.1; 264/177.13; 264/177.17; 264/210.8; 428/221
[58] Field of Search .................... 525/7.1, 8, 10, 525/165, 242, 244, 329.7, 330.3, 333.3, 437, 445; 264/176.1, 177.13, 177.17, 210.8; 428/221, 364

[56] References Cited

U.S. PATENT DOCUMENTS

| 4,104,261 | 8/1978 | Magosch et al. | ................... 260/873 |
| 5,364,669 | 11/1994 | Sumida et al. | ................... 428/1 |
| 5,552,478 | 9/1996 | Fisher | ................... 525/41 |
| 5,858,507 | 1/1999 | Yoshida et al. | ................... 428/141 |

*Primary Examiner*—Samuel A. Acquah
*Attorney, Agent, or Firm*—Pillsbury Madison & Sutro LLP

[57] ABSTRACT

Process for the production of preoriented filaments from polyester-based polymer mixtures by spinning the polymer mixtures with a draw-off speed v of at least 2500 m/min, a second amorphous, thermoplastically processable copolymer having a glass transition temperature of more than 100° C. being added to the polyester, wherein the ratio of the melt viscosity of the copolymer to the melt viscosity of the polyester is 1:1 to 10:1, in that the amount of copolymer added to the polyester is at least 0.05 wt. %, in that the maximum amount M of the copolymer added to the polyester depends on the draw-off speed v, and in that $$M = \left[\frac{1}{1600} \cdot v\left(\frac{m}{min}\right) - 0.8\right] [wt. \%]$$

21 Claims, No Drawings

PROCESS FOR PROCESSING POLYMER MIXTURES TO FILAMENTS

FIELD OF THE INVENTION

The present invention relates to a process for the production of preoriented filaments from polyester-based polymer mixtures prepared in the melt, with the addition of an amorphous, thermoplastically processable copolymer having a glass transition temperature of more than 100° C., by spinning the molten polymer mixtures with a draw-off speed v of at least 2500 m/min.

BACKGROUND OF THE INVENTION

Spinning of polymer mixtures is known from a number of publications:

EP 0 035 796 A (Teijin) describes synthetic fibers, inter alia of polyester or polyamide, which comprise 1–15 wt. % of a polysulphone polymer having a high glass transition point of $T_G \geq 150°$ C. The additive remains in the matrix in a spheroidal form and influences the surface structure of the filaments and the thread friction. The spinning speed is 2000–5500 m/min.

EP 0 041 327 B (ICI) discloses fibers of PET or PA-6.6 which comprise 0.1–10 wt. % of a further polymer having anisotropic properties (LCP types). The spinning speeds are 1000 to 5000 m/min. A speed suppression (WUSS) is achieved by a higher elongation at break of the strand and therefore higher stretching ratios and an increase in productivity.

EP 0 080 274 B (ICI) relates to fibers of PET, PA-6.6 or PP which comprise 0.1–10 wt. % of a further polymer which is present in the melt with an average particle size of 0.5–3 $\mu$m and is deformed to fibrils during melt spinning. The spinning speeds are 2000 to 6000 m/min, a speed suppression (WUSS: wind up speed suppression) of at least 20% being achieved by a higher elongation at break or lower birefringence of the (PET) strand, and therefore higher stretching ratios and an increase in productivity. Preferred additive polymers are polyethylene glycol or PA-6.6 for PET or polyolefins for PA-6.6. The effect reacts markedly to production parameters, such as throughput, spinning temperature, type of mixing or type of extruder. A transfer to production plants of different capacity, types of equipment or titer programs is made difficult by this sensitivity. We attribute the negative behavior to an unsuitable additive with too low a viscosity, too low a glass transition point and the tendency to crystallize.

JP 56-91013 A (Teijin) discloses a non-stretched polyester yarn, in which, by addition of 0,5–10 wt.-% of a styrene polymer, an improved productivity is achieved by increasing the elongation at break of the strand at speeds of between 850–8000 m/min, preferably $\geq 2500$ m/min, with correspondingly higher stretching ratios. No requirements are disclosed for the polymer mixture and the non-stretched yarn for the stretch texturizing.

EP 0 047 464 B (Teijin) relates to a non-stretched polyester yarn, in which, by addition of 0,2–10 wt.-% of a polymer of the type $-(CH_2-CR_1R_2)_n$, such as poly(4-methyl-1-pentene) or polymethyl methacrylate, an improved productivity is obtained by increasing the elongation at break of the strand at speeds of between 2500–8000 m/min, with correspondingly higher stretching ratios. A fine and uniform dispersion of the additive polymer by mixing is needed, it being necessary for the particle diameter to be $\leq 1$ $\mu$m to avoid the formation of fibrils. The combined effect of three properties is said to be decisive for the action—the chemical structure of the additive, which scarcely allows extension of the additive molecules, the low mobility and the compatibility between the polyester and additive. The measures serve to increase productivity. No requirements are disclosed for the stretch texturizing.

EP 0 631 638 B (AKZO) describes fibers of predominantly PET which contains 0.1–5 wt. % of a polymethacrylic acid alkyl ester imidized to the extent of 50–90%. The fibers obtained at speeds of 500–10,000 m/min and subsequently finally stretched have a higher initial modulus. Spinning at very high speeds (such as 8000 m/min) is said to be possible with conventional thread breakage counts. Up to 8000 m/min partly oriented yarns which are not yet stretched to the final elongation and can be processed e. g. to texturized yarns are obtained. In the examples of industrial yarns, the influence on the modulus cannot be readily reconstructed; in general, the strengths achieved are lower, which is a considerable disadvantage for this product. For textile applications, only stretched yarns are described. The associated unstretched yarns at a spinning speed of from 6000 m/min show elongations at break of $\leq 65.3\%$, which are probably not processable by stretch texturizing because of the accompanying high crystallization (shrinkage at the boil $\leq 6.5\%$).

Spinning of polymer mixtures to synthetic fibers has the aim of obtaining a higher elongation at break in the strand at a particular spinning speed than without modification by an additive polymer. As a result, a higher stretching ratio for production of the final yarn is said to be possible, which is said to have the effect of a higher productivity of the spinning unit. According to EP 0 041 327 B, for example, a production gain of:

$$\frac{\left(1+\frac{E'}{100}\right)-\left(1+\frac{E}{100}\right)}{\left(1+\frac{E}{100}\right)} \cdot 100\%$$

where E/E' are the non-modified/modified elongations at break, is to be expected. Investigation of the formula shows that the effect is the greatest at high increases in elongation (E'-E). However, elongations which are too high and therefore a reduced degree of orientation of the strand are unsuitable for processing in high-speed stretch texturizing processes.

Another way of increasing productivity is described in EP 0 080 274 B by the parameter WUSS$\geq 20\%$. At a spinning speed which is at least 20% higher, the same elongation at break in the strand is obtained as at the correspondingly lower speed with non-modified polymer. No running properties in the spinning mill at a higher speed and during further processing or properties of the final yarns produced there are disclosed. It has been found that the average particle sizes claimed, of $\geq 0.5$ $\mu$m, are unsuitable for commercial processing of the mixture, since such particle distributions lead to many capillary and thread breakages.

Increasing production is targeted at improving the profitability of the production process. This is curtailed again to a certain extent by production difficulties and expensive high-speed equipment. The additional costs for the additive polymer have a substantial influence, so that, depending on the amount added, there is even a zero point for the profitability. The availability of the additive polymers on the market also plays an important role. For these reasons, a large number of the additives described in the literature are eliminated from large-scale industrial conversion.

The producer or processor must take into account the entire production chain, and cannot stop at increasing production of a component step (e. g. spinning). The secondary processes should not be impaired. In particular, one of the main aims of this invention is not to curtail and preferably to improve the further processing conditions in the secondary steps, in spite of an increased spinning speed.

Very high elongations at break are thus mentioned in the prior art for polymer mixtures also for high spinning speeds, these characterizing a marked reduction in the degree of orientation. As is known, such strands are not storage-stable, and cannot be spread and processed at high speeds in friction texturizing processes. Elongations at break of <70% stated for high spinning speeds in turn indicate a considerable degree of crystallization, which reduces the strengths which can be achieved in the texturizing process.

SUMMARY OF THE INVENTION

The object of the present invention is to provide a process for processing polymer mixtures based on polyester at a draw-off speed of $\geq 2500$ m/min to preoriented filaments, which are preferably suitable for stretch texturizing, in which the abovementioned disadvantages do not occur. In particular, the costs of the additive added to the polyester should be as low as possible, i. e. the additive must be inexpensive, and the amount added must be kept low. Spinning of the polymer mixture must lead to an increase in production compared with the non-modified matrix polymer and allow processing of the strand at a high speed in the stretch texturizing process.

According to the invention, this object is achieved by a process in which the ratio of the melt viscosity of the copolymer to the melt viscosity of the polyester is 1:1 to 10:1, the amount of copolymer added to the polyester corresponds to at least 0.05 wt. % (based on the polyester) and not more than an amount M, where M is given by the formula $$M = \left[\frac{1}{1600} \cdot v\left(\frac{m}{min}\right) - 0.8\right] \text{ [wt. \%]}.$$

According to the invention, a copolymer is added to the polyester in an amount of at least 0.05 wt. %, where the copolymer must be amorphous and largely insoluble in the polyester matrix. The two polymers are substantially incompatible with one another and form two phases which can be distinguished under the microscope. Furthermore, the copolymer must have a glass transition temperature (determined by DSC with a heating up rate of 10° C./min) of more than 100° C. and must be thermoplastically processable.

The melt viscosity of the copolymer here is to be chosen such that the ratio of the melt viscosity, extrapolated to the measurement time of zero and measured at an oscillation rate of 2.4 Hz and a temperature equal to the melting temperature of the polyester plus 34.0° C. (for polyethylene terephthalate 290° C.), in relation to that of the polyester, measured under the same conditions, is between 1:1 and 10:1. That is, the melt viscosity of the copolymer is at least equal to or preferably higher than that of the polyester. Only by the choice of a specific viscosity range for the additive (copolymer) or by the choice of a specific viscosity ratio of the additive and polyester is the optimum degree of action achieved. With a viscosity ratio optimized in this way, it is possible to minimize the amount of additive added, as a result of which the profitability of the process becomes particularly high and particularly favorable processing properties are achieved. Surprisingly, the viscosity ratio determined according to the invention as ideal for use of polymer mixtures for the production of synthetic filament yarns is above the range identified in the literature as favorable for the mixing of two polymers. In contrast to the prior art, polymer mixtures with high molecular weight copolymers had an excellent spinnability.

Due to the high flow activation energy of the additive polymers, the viscosity ratio further increases drastically in the region of thread formation after discharge of the polymer mixture from the spinneret. By the choice of a favorable viscosity ratio, a particularly narrow particle size distribution of the additive in the polyester matrix is achieved, and by combination of the viscosity ratio with a flow activation energy of significantly more than that of the polyester (PET about 60 kJ/mol), i. e. of more than 80 kJ/mol, preferably more than 100 kJ/mol, the required fibril structure of the additive in the strand is obtained.

The glass transition temperature, which is high compared to the polyester, ensures a rapid consolidation of this fibril structure in the strand. The maximum particle sizes of the additive polymer here immediately after discharge from the spinneret are about 1000 nm, while the average particle size is 400 nm or less.

The ratio of the melt viscosity of the copolymer to that of the polyester under the abovementioned conditions is preferably between 1.4:1 and 8:1. A ratio of the melt viscosities of between 1.7:1 and 6.5:1 is particularly preferred. Under these conditions, the average particle size of the additive polymer is 220–350 nm.

The amount of copolymer to be added to the polyester is at least 0.05 wt. %. For many applications, amounts added of less than 1.5% are sufficient at draw-off speeds above 3500 and up to 6000 m/min and more, even often less than 1.0%, which is a considerable cost advantage.

The maximum amount of additive polymer to be added according to this invention in relation to that of the polyester corresponds to the amount M, where M is defined as a function of the spinning draw-off speed v by the following formula:

$$M = \left[\frac{1}{1600} \cdot v\left(\frac{m}{min}\right) - 0.8\right] \text{ [wt. \%]}$$

Maximum amounts added of 1.39 to 2.95 wt. % thus result in the spinning speed range from 3500 to 6000 m/min.

Preferably, to achieve a particularly good profitability, the upper limit of the amount of additive to be added for draw-off speeds of more than 2900 m/min is defined by the parameter M*, where $$M^* = \left[\frac{1}{1650} \cdot v\left(\frac{m}{min}\right) - 1.73\right] \text{ [wt. \%]}$$

Amounts added of between 0.39 and 1.91 wt. % thus result for spinning speeds of 3500 to 6000 m/min.

For draw-off speeds of more than 4200 m/min, the amount of additive polymer to be added to the polyester is preferably at least equal to the parameter N, but at least equal to 0.05 wt. %, where $$N = \left[\frac{1}{3510} \cdot v\left(\frac{m}{\min}\right) - 1.14\right] [\text{wt. \%}]$$

For draw-off speeds of 4200 to 6000 m/min, the minimum amount is thus between 0.057 and 0.57 wt. %.

If the abovementioned preferred viscosity ratio of additive polymer to polyester is adhered to, the amount of copolymer to be added relative to that of the polyester preferably corresponds to the parameter P, where P=P*±0.2 wt. %, but is at least 0.05 wt. %, and where, for draw-off speeds of more than 3900 m/min $$P^* = \left[\frac{1}{2270} \cdot v\left(\frac{m}{\min}\right) - 1.45\right] [\text{wt. \%}]$$

The amount of additive to be added in this preferred case is thus between 0.07 wt. % and 1.39 wt. % for spinning speeds of 3900 to 6000 m/min.

For spinning speeds between 2500 m/min and the minimum spinning speeds specified here for M*, N and P, a minimum amount of 0.05 wt. % and a maximum amount of M apply, while for higher spinning speeds, the abovementioned ranges of amounts are preferably additionally used. These formulae of course also apply to spinning speeds of more than 6000 m/min up to about 12000 m/min.

Possible fiber-formimg matrix polymers are thermoplastically processable polyesters, such as polyethylene terephthalate (PET), polyethylene naphthalate, polypropylene terephthalate and polybutylene terephthalate. The homopolymers are preferred. However, copolymers of these polyesters with a content of up to about 15 mol % of conventional comonomers, such as e.g. diethylene glycol, triethylene glycol, 1,4-cyclohexanedimethanol, polyethylene glycol, isophthalic acid and/or adipic acid, are also possible. The polymers can additionally comprise additives, such as catalysts, stabilizers, optical brighteners and matting agents. The polyester can also comprise a small amount (not more than 0.5 wt. %) of branching components, that is to say e.g. polyfunctional acids, such as trimellitic acid or pyromellitic acid, or alcohols having 3-6—OH groups, such as trimethylolpropane, pentaerythritol, dipentaerythritol or glycerol, or corresponding hydroxy acids.

Mixing of the additive polymer (copolymer) with the matrix polymer is carried out by addition as a solid to the matrix polymer chips in the extruder intake with a chips mixer or gravimetric metering, or alternatively by melting the additive polymer, metering it by means of a gear pump and feeding it into the melt stream of the matrix polymer. A homogeneous distribution is then established by mixing in the extruder and/or by means of static or dynamic mixers. By a specific choice of the mixer and of the duration of the mixing operation, a defined particle distribution is advantageously established before the melt mixture is passed on through product distribution lines to the individual spinning stations and spinnerets. Mixers having a shear rate of 16 to 128 sec$^{-1}$ and a residence time in the mixer of at least 8 sec have proved suitable. The product of the shear rate (s$^{-1}$) and the 0.8th power of the residence time (in sec) here should be 250 to 2500, preferably 300 to 600.

The shear rate is defined here by the shear rate in the empty pipe (s$^{-1}$) times the mixer factor, the mixer factor being a characteristic parameter of the mixer type. For Sulzer-SMX types, for example, this factor is about 7–8.

The shear rate $\gamma$ in the empty pipe is calculated according to $$\gamma = \frac{4 \cdot 10^3 \cdot F}{\pi \cdot \delta \cdot R^3 \cdot 60} [s^{-1}]$$

and the residence time $\tau$ (s) according to $$\tau = \frac{F}{V_2 \cdot \varepsilon \cdot \delta \cdot 60}$$

wherein
F=amount of polymer conveyed (g/min)
$V_2$=internal volume of the empty pipe (cm$^3$)
R=diameter of the empty pipe (mm)
$\varepsilon$=empty volume content (for Sulzer-SMX types 0.84 to 0.88)
$\delta$=nominal density of the polymer mixture in the melt (about 1.2 g/cm$^3$)

Both the mixing of the two polymers and the subsequent spinning of the polymer mixture are carried out at temperatures, depending on the matrix polymer, in the range from 220 to 320° C.

The production of synthetic filaments from the polymer mixtures according to the invention by high-speed spinning with draw-off speeds of $\geq$2500 m/min is carried out using spinning devices which are known per se. The filter package here is equipped according to the known prior art with filter devices and/or loose filter media (e. g. steel grit).

After the shear and filtration treatment have taken place, the molten polymer mixture is forced through the bores of the die plate in the die package. In the subsequent cooling zone, the melt threads are cooled to below their softening point by means of cooling air, so that sticking or backing-up at the following thread guide organ is avoided. The construction of the cooling zone is not critical, as long as a homogeneous stream of air which penetrates the filament bundle uniformly is ensured. A still air zone can therefore be provided directly below the die plate to delay cooling. The cooling air can be fed in by blowing transversely or radially from an air-conditioning system, or can be taken from the environment by automatic suction by means of a cooling pipe.

After cooling, the filaments are bundled and charged with spinning oil. Oiler stones to which the spinning oil is fed as an emulsion by metering pumps are used for this. The prepared thread advantageously passes through a detangling device (a twisting device) to improve the thread compactness. Handling and safety devices may also be appropriate, before the thread arrives at the winding unit and is wound up there to packages on cylindrical bobbins. The circumferential speed of the thread package is regulated automatically and is the same as the winding-up speed. The draw-off speed of the thread can be 0.2–2.5% higher than the winding-up speed because of its changing movement. Driven godets can optionally be used after the preparation or before the winding up. The circumferential speed of the first godet system is designated the draw-off speed. Further godets can be used for stretching or relaxing.

The incompatibility of the two polymers has the effect that the additive polymer forms spheroidal or longitudinally shaped particles in the matrix polymer immediately after discharge of the polymer mixture from the spinneret. The length/diameter ratio is preferably >2. The best conditions resulted when the average particle size (arithmetic mean) $d_{50}$ was $\leq$400 nm and the content of particles >1000 nm in a sample cross-section was below 1%.

It was possible to demonstrate the influence of the spinning draft on these particles analytically. New studies on the strands by the TEM (transmission electron microscopy) method have shown that a fibril-like structure exists there. The average diameter of the fibrils has been estimated at approx. 40 nm. The length/diameter ratio of the fibrils here was >50. If these fibrils are not formed, or if the additive particles are too large in diameter after discharge from the spinneret, or if the size distribution is too non-uniform, which is the case with an inadequate viscosity ratio, the effect of the action is lost.

The rolling action described in the literature could not be reconstructed with the additive polymer according to the invention. The evaluation of microscope studies of the fiber cross-sections and longitudinal sections suggest that the spinning draft tension is passed to the additive fibrils which form and the polymer matrix distorts with little stress. The deformation of the matrix consequently takes place under conditions which result in a reduction of the orientation and suppression of spinning-induced crystallization. The effect is appropriately evaluated by the strand construction and the processing properties.

Furthermore, for the effectiveness of the additives according to this invention, a flow activation energy of the copolymers of at least 80 kJ/mol, that is to say a higher flow activation energy than that of the polyester matrix, is necessary. Only under this proviso is it possible for the additive fibrils to solidify before the polyester matrix and to absorb a considerable proportion of the enclosed spinning tension. As a result, it is possible to achieve the desired increase in capacity of the spinning unit.

As is known, the strand structure is substantially formed in the draft zone below the spinneret. The length of the draft zone is varied by the thread draw-off speed in the case of non-modified polymer. Typical values for roving yarns with conventional draw-off speeds of at least 2500 m/min are lengths of about 300 mm, preferably for POY $\geq$250 mm to $\leq$700 mm. In the process according to the invention, the draft zone is longer compared with conventional spinning. The sudden distortion (necking) of the filaments observed at high speeds is suppressed. The change in thread speed along the draft path assumes a value which corresponds to that of conventional POY produced at 3200 m/min.

The process according to the invention is similarly suitable for high-speed spinning of POY threads with a POY filament titer of >3 dtex to 20 dtex and more, and also POY filament titers of <3 dtex, in particular microfilaments of 0.2 to 2.0 dtex.

For further processing of the strand in the stretch texturizing process at high speeds, the following is important: Strands according to this invention as roving yarn for stretch texturizing—usually called POY—are produced with draw-off speeds of $\geq$2500 m/min, preferably >3500 m/min, particularly preferably >4000 m/min. These yarns must have a physical structure which is characterized by a specific degree of orientation and a low crystallization. The parameters of elongation at break, birefringence, degree of crystallization and shrinkage at the boil have proved appropriate for its characterization. The polymer mixture according to the invention is characterized by an elongation at break of the PET strands (POY) of at least 85% and not more than 180%. The shrinkage at the boil is 32–69%, the birefringence is between 0.030 and 0.075, the crystallinity is less than 20% and the tear strength is at least 17 cN/tex. The elongation at break of the PET strands is preferably between 85 and 160%. Particularly favorable circumstances exist if the elongation at break of the PET strands is between 109 and 146%, the tear strength at the same time is at least 22 cN/tex and the Uster value is not more than 0.7%.

Stretch texturizing is carried out at different speeds, depending on the filament titer type, speeds of $\geq$750 m/min, preferably $\geq$900 m/min, being used for normal-titer filaments of $\geq$2 dtex per filament (final titer). For microfilaments and fine titers (final titer) of <2 dtex, speeds of between 400 and 750 m/min are preferred. The process can advantageously be applied to these titers, and in particular microfilaments of between 0.15 and 1.10 dtex (final titer) per filament.

The stretching ratios to be applied are between 1.35 and 2.2 for the strands specified, stretching ratios in the upper range preferably being used for a lower degree of orientation and vice versa. During the stretch texturizing, the stretching ratio is influenced by variations in tension (surging) as a function of the operating speed. Particularly preferred stretching ratios are therefore those according to the formula:

$$\text{stretching ratio} = 5 \cdot 10^{-4} \cdot w \text{ (m/min)} + b$$

wherein
w=stretch texturizing speed in m/min
b=constant which lies between 1.15 and 1.50, to be applied.

The additive polymers to be added according to the invention to the polyester can have a varying chemical composition, as long as they have the abovementioned properties. Three different copolymer types are preferred, that is to say 1. A copolymer which comprises the following monomer units:

A=acrylic acid, methacrylic acid or $CH_2$=CR—COOR', wherein R is an H atom or a $CH_3$ group and R' is a $C_{1-15}$-alkyl radical or a $C_{5-12}$-cycloalkyl radical or a $C_{6-14}$-aryl radical, B=styrene or $C_{1-3}$-alkyl-substituted styrenes, wherein the copolymer comprises 60 to 98 wt. % A and 2 to 40 wt. % B, preferably 83 to 98 wt. % A and 2 to 17 wt. % B, and particularly preferably 90 to 98 wt. % A and 2 to 10 wt. % B (total=100 wt. %).

2. A copolymer which comprises the following monomer units:

C=styrene or $C_{1-3}$-alkyl-substituted styrenes,
D=one or more monomers of the formula I, II or III

(I)

(II)

(III)

wherein $R_1$, $R_2$ and $R_3$ are each an H atom or a $C_{1-15}$-alkyl radical or a $C_{5-12}$-cycloalkyl radical or a $C_{6-14}$-aryl radical, wherein the copolymer comprises 15 to 95 wt. % C and 5 to 85 wt. % D, preferably 50 to 90 wt. % C and 10 to 50 wt. % D, and particularly preferably 70 to 85 wt. % C and 15 to 30 wt. % D, the total of C and D together being 100%.

3. A copolymer which comprises the following monomer units:

E=acrylic acid, methacrylic acid or $CH_2=CR-COOR'$, wherein R is an H atom or a $CH_3$ group and R' is a $C_{1-15}$-alkyl radical or a $C_{5-12}$-cycloalkyl radical or a $C_{6-14}$-aryl radical, F=styrene or $C_{1-3}$-alkyl-substituted styrenes, G=one or more monomers of the formula I, II or III

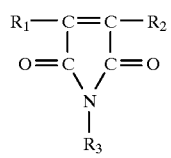

(I)

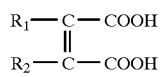

(II)

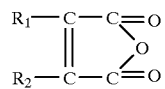

(III)

wherein $R_1$, $R_2$ and $R_3$ are each an H atom or a $C_{1-5}$-alkyl radical or a $C_{5-12}$-cycloalkyl radical or a $C_{6-14}$-aryl radical, H=one or more ethylenically unsaturated monomers, which can be copolymerized with E and/or with F and/or G, from the group which consists of α-methylstyrene, vinyl acetate, acrylic acid esters, methacrylic acid esters which differ from E, vinyl chloride, vinylidene chloride, halogen-substituted styrenes, vinyl ethers, isopropenyl ethers and dienes, the copolymer comprising 30 to 99 wt. % E, 0 to 50 wt. % F, >0 to 50 wt. % G and 0 to 50 wt. % H, preferably 45 to 97 wt. % E, 0 to 30 wt. % F, 3 to 40 wt. % G and 0 to 30 wt. % H, and particularly preferably 60 to 94 wt. % E, 0 to 20 wt. % F, 6 to 30 wt. % G and 0 to 20 wt. % H, the total of E, F, G and H together being 100%.

Component H is an optional component. Although the advantages to be achieved according to the invention can already be achieved by copolymers which contain components from groups E to G, the advantages to be achieved according to the invention also arise if further monomers from group H participate in the building up of the copolymer to be employed according to the invention.

Component H is preferably chosen such that it has no adverse effect on the properties of the copolymers to be used according to the invention.

Component H can be employed, inter alia, to modify the properties of the copolymer in a desired manner, for example by increases or improvements in the flow properties when the copolymer is heated to the melting temperature, or to reduce a residual color in the copolymer or, by using a polyfunctional monomer, to introduce a certain degree of crosslinking into the copolymer in this manner.

In addition, H can also be chosen such that copolymerization of components E to G is rendered possible at all or is assisted, such as in the case of MAA and MMA, which do not in themselves copolymerize, but copolymerize without problems on addition of a third component, such as styrene.

Monomers which are suitable for this purpose include, inter alia, vinyl esters, esters of acrylic acid, for example methyl and ethyl acrylate, esters of methacrylic acid which differ from methyl methacrylate, for example butyl methacrylate and ethylhexyl methacrylate, vinyl chloride, vinylidene chloride, styrene, α-methylstyrene and the various halogen-substituted styrenes, vinyl and isopropenyl ether, dienes, such as, for example, 1,3-butadiene, and divinylbenzene. The reduction in the colour of the copolymer can particularly preferably be achieved, for example, by using an electron-rich monomer, such as, for example, a vinyl ether, vinyl acetate, styrene or α-methylstyrene.

Particularly preferred compounds of component H are aromatic vinyl monomers, such as, for example, styrene or α-methylstyrene, The preparation of the copolymers to be used according to the invention is known per se. They can be prepared by bulk, solution, suspension or emulsion polymerization. Helpful information with respect to bulk polymerization is to be found in Houben-Weyl, volume E20, part 2 (1987), page 1145 et seq. Information on solution polymerization is likewise to be found there on page 1156 et seq. The suspension polymerization technique is likewise described on page 1149 et seq., while emulsion polymerization is likewise described and explained on page 1150 et seq.

Bead polymers, the particle size of which lies in a particularly favorable range, are particularly preferred in the context of the invention. The copolymers to be used according to the invention, for example, by mixing into the melt of the fiber polymers are particularly preferably in the form of particles having an average diameter of 0.1 to 1.0 mm. However, larger or smaller beads or granules can also be employed.

The polymers according to the invention can comprise, as further constituents, additives such as are usual for thermoplastic molding compositions and contribute towards improving the polymer properties. Examples of these are: antistatics, antioxidants, flameproofing agents, lubricants, dyestuffs, light stabilizers, polymerization catalysts and auxiliaries, adhesion promoters, matting agents and/or organic phosphites. These additives are employed in the usual amounts, preferably in amounts of up to 10 wt. %, preferably <1 wt. %, based on 100 wt. % of the copolymers.

The imidized copolymer types 2 and 3 can be prepared both from the monomers using a monomeric imide and by subsequent complete or, preferably, partial imidation of a copolymer comprising the corresponding maleic acid derivative. These additive polymers are obtained, for example, by complete or, preferably, partial reaction of the corresponding copolymer with ammonia or a primary alkyl- or arylamine, for example aniline, in the melt phase (Encyclopedia of Polymer Science and Engineering vol. 16 [1989], Wiley-Verlag, page 78). All the copolymers according to the invention, as well as their non-imidized starting copolymer, where appropriate, are commercially obtainable or can be prepared by a process familiar to one skilled in the art.

For polymer mixtures of polyethylene terephthalate with an intrinsic viscosity of about 0.55 to 0.75 dl/g and copolymers of type 1, 2 or 3, copolymers having viscosity numbers in the range from 70 to 130 $cm^3/g$ are preferred.

The process according to the invention enables the draw-off speed during strand production to be increased substantially compared with the prior art by the addition of a copolymer to the polyester, while the stretching ratio during the stretch texturizing can be kept constant, corresponding to the non-modified polyester. The capacity of the production unit therefore increases directly proportionally to the draw-off speed.

Since the capacity of the spinning station is proportional to the product of the stretching ratio and draw-off speed, the gain in capacity in the spinning mill is:

$$\text{Capacity gain} = \left(\frac{VV_1 \cdot v_1}{VV_0 \cdot v_0}\right) \cdot 100 \ [\%]$$

wherein
$VV_1$=stretching ratio with additive
$VV_0$=stretching ratio without additive
$v_1$=winding up speed of the strand with additive
$v_0$=winding up speed of the strand without additive
Typically $v_0$ is in the range from 2500 to 3500 m/min and $VV_0$ is between 1.35 and 2.2, corresponding to the spinning speed according to the known prior art.

The dependent variables M, M*, P and N according to the invention state that the amount of additive added may not be chosen independently of the draw-off speed if the aim of producing, from polymer mixtures, preoriented filaments of low crystallinity which are suitable for stretch texturizing is to be achieved. It is necessary to avoid here on the one hand the degree of preorientation being too low, that is, for example, the elongation at break will be too high, and on the other hand a noticeable spinning-induced crystallization occurring at too high a degree of orientation. The stretching ratio during stretch texturizing has been determined for filaments produced at various draw-off speeds and additive concentrations. The relationships of M*, P* and N here are represented as lines of constant stretching ratio. This results in a particular advantage of this process. The filament producer can choose and adjust the amount of additive at any desired draw-off speed such that a stretching ratio which is optimum for the further processing conditions is obtained. Stretch texturizing is therefore carried out under optimum, selectable conditions.

The values for properties stated in the following examples and in the above text were determined as follows:

Distribution of the additive particles: Melt strands or pellet samples were broken down with a sharp chisel in liquid nitrogen. The broken surfaces were investigated by means of scanning electron microscopy and subsequent evaluation by image analysis, taking as the basis an elliptical form (spheroidal), the length, width and, calculated therefrom, average diameter being evaluated.

Thread speeds were determined by means of laser Doppler anemometry using a diode laser of 10 mW output (TSI GmbH, Aachen, Germany, type LS50M). In this method, a laser beam is divided and the two component beams are made to intersect on the object to be measured. The interference frequency is measured in the backscatter region and the object speed is calculated from the shift in the interference frequency. The thread speed was measured at several distances underneath the spinneret. The change in speed until the speed defined by the draw-off device is reached characterizes the spinning draft zone. The length in mm. between the speed points of 1000 m/min and 90% of the final speed was defined as the measure. This draft length is usually several 100 mm. At high spinning speeds, it can be shortened to about 100 mm, a constriction (necking) of the thread occurring; the change in thread speed in the region from about 1750 m/min is then almost punctiform.

The intrinsic viscosity was determined on a solution of 0.5 g polyester in 100 ml of a mixture of phenol and 1,2-dichlorobenzene (3:2 parts by wt.) at 25° C.

The viscosity number VN (also Staudinger function) is the concentration-related relative change in the viscosity of a 0.5% solution of the copolymer in chloroform, based on the solvent, the flow-through times being determined in an Ubbelohde viscometer with a suspended ball level, Schott type no. 53203 and capillary 0c in accordance with DIN standard 51562 at 25° C. Chloroform was used as the solvent.

$$VN = \left(\frac{t}{t_0} - 1\right) \cdot \frac{1}{c}$$

wherein
t=flow-through time of the polymer solution in seconds
$t_o$=flow-through time of the solvent in seconds
c=concentration in g/100 cc.

To determine the melt viscosity (initial viscosity), the polymer was dried in vacuo to a water content of $\leq 1000$ ppm (polyester $\leq 50$ ppm). The granules were then introduced on to the temperature-controlled measuring plate in a ball-plate rheometer, type UM100 (Physica Messtechnik GmbH, Stuttgart, Germany), with masking with nitrogen. After the sample had melted, i. e. after approx. 30 seconds, the measuring ball (MK210) was positioned on the measuring plate. The measurement was started after a further heating up period of 60 seconds (measurement time=0 seconds). The measurement temperature was 290° C. for polyethylene terephthalate and additive polymers added to polyethylene terephthalate, or was the same as the melting temperature (method follows) of the polyester in question plus 34.0° C. The measurement temperature specified in this way corresponds to the typical processing or spinning temperature of the particular polyester. The amount of sample was chosen such that the rheometer gap was filled completely. The measurement was carried out in oscillation with a frequency of 2.4 Hz (corresponding to a shear rate of 15 $\text{sec}^{-1}$) and a deformation amplitude of 0.3, and the value of the complex viscosity was determined as a function of the measurement time. Thereafter, the initial viscosity was converted to the measurement time zero by linear regression.

For the determination of the melting temperature of the polyester, the polyester sample was first melted at 310° C. for 1 min and quenched to room temperature immediately thereafter. The melting temperature was then determined by DSC measurement (differential scanning calorimetry) at a heating up rate of 10° C./min. The pretreatment and measurement were carried out with masking with nitrogen.

The flow activation energy (E) is a measure of the rate of change of the zero viscosity as a function of the change in measurement temperature, the zero viscosity being the viscosity extrapolated to the shear rate 0. The zero viscosity was measured at temperatures in the range from 240 to 280° C. with a high-pressure capillary rheometer, (Rheograph 2002, Gottfert GmbH, Buchen, Germany), and the results were evaluated by the three parameter plot of Carreau-Winter. Thereafter, the flow activation energy was determined by means of the Arrhenius plot from the zero viscosity in accordance with the method of M. Pahl et al., Praktische Rheologie der Kunststoffe and Elastomere [Practical rheology of plastics and elastomers], VDI-Verlag, Düsseldorf (1995), pages 256 et seq.

The strength properties were determined with a tensile tester at a clamped length of 200 mm, a pretension force of 0.05 cN/dtex and a test speed of 2000 mm/min.

The shrinkage at the boil was determined on fibers which had been conditioned at room temperature and treated beforehand for 10 min in water of 95±1° C.

The birefringence was measured as described in DE 195 19 898 A and the Uster-values were measured as described in EP 0 346 641 B.

The stretching force was determined with a Dynafil M apparatus (from Textechno, Mönchengladbach, Germany) at a heating tube temperature of 200° C. and a test speed of 100 m/min.

The crystallinity (C) was calculated from the density ρ according to $$C\,[\%] = \frac{1.455 \cdot \rho - 1.938}{\rho \cdot 0.123} \cdot 100$$

the density being determined on short knotted pieces of thread at 23° C. by the density gradient method (in CCl$_4$/n-heptane).

The crimping parameters of the texturized filament yarns (nominal titer to 500 dtex) were determined in accordance with DIN 53840, part 1.

The depth of dyeing was determined on a circular knitted piece dyed with Terasil navy blue GRL-C 200% (Ciba-Geigy, Basel, Switzerland) by comparative measurement of the color reflection with a reflectance photometer in accordance with DIN 54001.

DETAILED DESCRIPTION OF THE PREFERRED EMBODIMENTS

COMPARATIVE EXAMPLE 1

Polyethylene terephthalate having an intrinsic viscosity η$_{intr}$=0.64 dl/g (corresponds to an initial viscosity of 250 Pa s) and a residual water content of <50 ppm was melted in a single-screw extruder and fed with a temperature of 296° C. through a product line with 15 static mixing elements, type SMX, nominal width DN 15 (from Sulzer AG, Zurich, Switzerland) and empty pipe sections—to ensure a residence time or duration of the exposure of the melt to heat which is relevant on a large industrial scale—by means of a gear metering pump via a spinneret adapter to the spinneret package.

The strands emerging from the bores of the die plate were cooled in a conventional blowing shaft with transverse blowing, the air speed being adjusted to 0.45 m/sec.

At a distance of 1200 mm below the spinneret, the cooled strands were bundled by means of an oiler pin and provided with a spinning oil-water emulsion, the amount of preparation applied to the thread being 0.35%, based on the thread weight.

The thread bundle was drawn off by means of two driven godets entwined in s-shaped form and wound on empty bobbins to yarn packages in a winding unit (from Barmag AG, Remscheid, Germany), type SW7, with birotor changing. The spinning draw-off speed was defined by the circumferential speed of the godets. The winding speed was set about 1% 30 lower, so that a tension of 10 cN resulted between the godets and winder. The nominal titer of the thread produced in this way was 84/34 dtex.

The take-off speed was adjusted to 3200 m/min, an amount of polymer of 41.1 g/min being fed to the spinneret. The strand characteristic data are summarized in Table 1.

TABLE 1

| Reference POY | | |
|---|---|---|
| Comparative Experiment | No. | 1 |
| Residence time | min | 11 |
| Titer | dtex | 130 |
| Tear strength | cN/tex | 25.3 |
| CV breaking load | % | 2.6 |
| Elongation at break | % | 117.3 |
| CV elongation at break | % | 2.3 |

TABLE 1-continued

| Reference POY | | |
|---|---|---|
| Comparative Experiment | No. | 1 |
| Uster - half inert | U % | 0.23 |
| - normal | U % | 0.66 |
| Shrinkage at the boil | % | 64 |
| Birefringence | ·10$^{-3}$ | 48.4 |

5 CV: coefficient of variation

EXAMPLE 2

The spinning system according to Example 1 was supplemented by a metering device comprising a compounding extruder and a gear metering pump. Using this metering system, the additive, with a residual water content of <1000 ppm and in the form of granules, was melted and metered as a melt in a concentration of 1.0 wt. % into the PET melt stream and mixed in by means of a static mixer at a residence time in the mixer of 44 s. The polymer mixture was spun at a temperature of 296° C. under spinning conditions otherwise the same as in Example 1. The additive of Comparative Example 2 is the commercial product Delpet 80N (from Asahi Kasei, Japan), a polymethyl methacrylate with a viscosity number VN=61.2 ccm/g.

The spinning draw-off speed, however, was adjusted to a constant speed of 5000 m/min. The polymer throughput was 63 g/min, which resulted in an average residence time of the melt of about 7.5 min before entry into the spinneret package.

In Comparative Experiment 3, the additive Delpet 80N was metered in a concentration of 1.8 wt. % into the PET melt stream and spun under the same conditions.

In Experiments 4–9, polymer mixtures according to the invention were spun under the same conditions, but the amount of the particular copolymer added was only 0.65 wt. %. The additives were products from Degussa AG, Hanau, Germany, that is to say copolymers with, in the polymer, 8.8 wt. % styrene (S) and 91.2 wt. % methyl methacrylate (MMA) and various viscosity numbers (according to table 2).

In Experiment 9, otherwise under the same conditions, a polymer mixture was prepared and spun at a temperature of only 286° C. The strand characteristic data for this and the abovementioned experiments are summarized in Tables 2a and 2b.

TABLE 2a

| Comparative Experiment | No. | 2 | 3 |
|---|---|---|---|
| Additive | | PMMA | PMMA |
| Concentration | wt. % | 1.0 | 1.8 |
| Viscosity number | ccm/g | 61 | 61 |
| Viscosity ratio* | :1 | 0.9 | 0.9 |
| Titer | dtex | 129 | 129 |
| Drawoff speed | m/min | 5000 | 5000 |
| Spinning temperature | °C. | 296 | 296 |
| Elongation at break | % | 77.7 | 118.5 |

TABLE 2b

|  |  | Experiment No. | | | | | |
| --- | --- | --- | --- | --- | --- | --- | --- |
|  |  | 4 | 5 | 6 | 7 | 8 | 9 |
| Additive |  | P(SMMA) | P(SMMA) | P(SMMA) | P(SMMA) | P(SMMA) | P(SMMA) |
| Concentration | wt. % | 0.65 | 0.65 | 0.65 | 0.65 | 0.65 | 0.65 |
| Viscosity number | ccm/g | 84 | 91 | 98.5 | 103.7 | 118.4 | 98.5 |
| Viscosity ratio* | :1 | 1.7 | 2.4 | 4.4 | 4.5 | 5.1 | 4.4 |
| E** | kJ/mol |  |  |  | 110 |  |  |
| Titer | dtex | 130 | 129 | 130 | 129 | 129 | 130 |
| Draw-off speed | m/min | 5000 | 5000 | 5000 | 5000 | 5000 | 5000 |
| Spinning temperature | ° C. | 296 | 296 | 296 | 296 | 296 | 286 |
| Elongation at break | % | 96.4 | 112.1 | 115.1 | 123.4 | 113.2 | 116.1 |

*Melt viscosity of the additive polymer to melt viscosity of the polyester (= 1)
**Flow activation energy When the viscosity number of the additive polymer added is increased, an increase in the elongation at break is initially found, i. e. a maximum improvement in the economic efficiency of the process is observed on addition of the copolymer with a viscosity number of about 105 cc/g. When an additive polymer with an even higher viscosity number is added, the economic efficiency of the process decreases again slowly.

Compared with the additive disclosed in EP 47 464 B, about the same capacity-increasing effect is achieved with the copolymers according to the invention with viscosity numbers in the range from 91 to 118 ccm/g, with a drastically reduced amount of additive.

This reduction in the amount of additive not only is advantageous economically, but also means a considerable technological advantage. Impairments in the further processing properties, such as e.g. sticking of additive inclusions on the thread surface to the hot metal surfaces of the heaters of texturizing units, are reduced considerably if it is possible— as in the context of this invention—to decrease the amount of additive added. Furthermore, the boundary between additive inclusions and polyester matrix represents a defective point in the transfer of mechanical stresses in the yarn, because of the incompatibility of the two materials, which at high additive concentrations can lead to capillary breakages.

This effect is more pronounced the higher the amount of additive, and impairs the texturizing properties and the tear strength of the texturized yarn.

In Experiment Nos. 6 and 9, in spite of the drastically changed pre-exposure of the melt mixture to heat by using a spinning temperature of 286° C. and 296° C. respectively, virtually the same elongations at break are achieved, i. e. the additive according to the invention is distinguished by a good heat stability in the temperature range relevant on a large industrial scale.

EXAMPLE 3

In further experiments further polymer mixtures were spun under the same conditions as in Example 2, the amount of the particular additive added being 0.72 wt. %. The additives were copolymers from Degussa AG (Hanau, Germany) with, in the polymer, 8.8 wt. % styrene, 86.2 wt. % MMA and 5 wt. % N-cyclohexylmaleimide and various viscosity numbers, as shown in Table 3, which also contain the strand characteristic data.

TABLE 3

|  |  | Experiment No. | | | | | | | |
| --- | --- | --- | --- | --- | --- | --- | --- | --- | --- |
|  |  | 10 | 11 | 12 | 13 | 14 | 15 | 16 | 17 |
| Additive concentration | wt. % | 0.72 | 0.72 | 0.72 | 0.72 | 0.72 | 0.72 | 0.72 | 0.72 |
| Viscosity number | ccm/g | 61 | 72 | 88 | 99.4 | 99.6 | 113.7 | 128.6 | 174 |
| Viscosity ratio* | :1 | 0.8 | 2.0 | 3.2 | 4.0 | 4.2 | 5.6 | 9.6 | 11.2 |
| E** | kJ/mol |  |  |  |  |  | 120 |  |  |
| Titer | dtex | 129 | 129 | 131 | 131 | 129 | 131 | 129 | 129 |
| Draw-off speed | m/min | 5000 | 5000 | 5000 | 5000 | 5000 | 5000 | 5000 | 5000 |
| Spinning temperature | ° C. | 296 | 296 | 296 | 296 | 296 | 296 | 296 | 296 |
| Elongation at break | % | 70.1 | 85.5 | 106.7 | 125.9 | 127.6 | 133 | 125.1 | 49.2 |

(* and ** see table 2b)

Comparative Experiment Nos. 10 and 17 and Experiment Nos. 11 to 16 again confirm the existence of a pronounced optimum of the additive viscosity with regard to the capacity-increasing effect and the elongation at break. In the range of viscosity numbers from 61 to about 100 cc/g, the profitability of the process initially increases virtually linearly with the viscosity number. In the range from VN=100 cc/g up to the viscosity number of about 115 cc/g the economic efficiency then improves further only slightly. Above this optimum, the economic efficiency again is reduced slightly up to the viscosity number of about 130 cc/g. At VN=174 cc/g, a distinctly negative effect in respect of capacity occurs. Experiment No. 11 gives a POY with a lower elongation at break than the other experiments and therefore lies in the limit region of the invention.

EXAMPLE 4

In Experiment No. 18, a die package with a die plate with 17 bores instead of 34 bores was employed in the spinning system from Example 2.

Under otherwise unchanged conditions, 0.65 wt. % of the additive according to the invention was mixed in with 8.8 wt. % styrene and 91.2 wt. % MMA of viscosity number VN=98.5 ccm/g, and the polymer mixture was spun to a thread with a nominal titer of 84/17 dtex at an amount of polymer of 63 g/min, a spinning draw-off speed of 5000 m/min and a spinning temperature of 296° C.

In Experiment No. 19, under otherwise unchanged conditions, a spinneret plate with 72 bores, bore diameter 0.10 mm, L=2D, was employed and a polymer mixture with the same additive as in Experiment No. 18 was spun at a spinning speed of 5000 m/min to a thread of nominal titer 84/72 dtex.

Finally, a spinneret plate with 120 bores, bore diameter 0.13 mm, 1=2D, was employed and with an addition of 0.65 wt. % of the same additive as before, an amount of polymer of 58 g/min and a spinning speed of 4500 m/min, a thread of nominal titer 84/120 dtex was spun (experiment no. 20).

The characteristic data of all the strands are summarized in Table 4.

TABLE 4

| Experiment | No. | 18 | 19 | 20 |
| --- | --- | --- | --- | --- |
| Nominal titer | dtex | 84/17 | 84/72 | 84/120 |
| Additive concentration | wt. % | 0.65 | 0.65 | 0.65 |
| Spinning temperature | °C. | 296 | 296 | 296 |
| Titer | dtex | 127 | 128 | 128 |
| Draw-off speed | m/min | 5000 | 5000 | 4500 |
| Elongation at break | % | 111.1 | 110.6 | 112.2 |

COMPARATIVE EXAMPLE 5

Polyethylene terephthalate having an intrinsic viscosity $\eta_{intr}$=0.64 dl/g (corresponding to an initial viscosity of 250 Pa s) and a residual water content of <50 ppm was melted in a single-screw extruder with mixing component LTM 3D, type 4E4 24D (from Barmag AG, Remscheid, Germany), and fed with a temperature of 290° C. by means of a gear metering pump through a product line with 7 static mixing elements, type SMX (from Sulzer AG, Zurich, Switzerland), and empty pipe sections (to ensure a residence time which is relevant on a large industrial scale) to a further gear metering pump, called the spinning pump in the following.

At the discharge of this spinning pump, the melt was divided into 6 component streams with throughputs the same as one another. Each of these component streams was fed through a spinneret adapter with 2 static mixers, type SMX DN 10 (from Sulzer AG, Zurich, Switzerland), to a spinneret package.

The die package comprised, viewed in the melt flow direction, defined shear and filtration means of the following construction: steel grit volume of particle size 350 to 500 μm, support plate, second fabric filter of 20 μm, spinneret plate with 34 bores, bore diameter 0.25 mm, L=2D and a diameter of the plate of 80 mm, corresponding to a filter area of 40 cm. With a varied polymer throughput, a pressure of 110–190 bar is established.

The strands emerging from the bores of the spinneret were cooled in a conventional blowing shaft with transverse blowing, the air speed being adjusted to 0.55 m/min.

At a distance of 1500 mm below the spinneret, the cooled strands were bundled by means of an oiler pin and provided with a spinning oil-water emulsion, the amount of preparation applied to the threads being about 0.35%.

The thread bundle was drawn off by means of two driven godets entwined in s-shaped form and wound on 6 empty bobbins to yarn packages in a winding unit (from Barmag AG, Remscheid, Germany, type CW8 T-920/6) with birotor changing. The spinning draw-off speed was defined by the circumferential speed of the godets. The winding speed was set about 1% lower, so that a tension of about 10 cN resulted between the godet and winder. The nominal titer of the threads produced in this way was 84/34 dtex.

The draw-off speed was adjusted to 3200 m/min, an amount of polymer per spinneret of 44 g/min being established, resulting in an average residence time of the melt before entry into the spinning pump of about 15 min. In a second experiment, the draw-off speed was increased to 5000 m/min and at the same time an amount of polymer of 63 g/min per spinneret with an average residence time of about 11 min was established. The characteristic data of the strands are summarized in Table 5 as the mean of all 6 bobbins of each individual experiment.

TABLE 5

| Comparative Experiment | No. | E1 | E2 |
| --- | --- | --- | --- |
| Residence time | min | 15 | 11 |
| Number of SMX elements | | 7 | 7 |
| Spinning temperature | °C. | 290 | 290 |
| Draw-off speed | m/min | 3200 | 5000 |
| Spinning titer | dtex | 130 | 128 |
| Elongation at break | % | 117.3 | 63.7 |
| CV elongation at break | % | 2.3 | 5.0 |
| Tear strength | cN/tex | 25.3 | 36.4 |
| CV breaking load | % | 2.6 | 3.0 |
| Birefringence | $\times 10^{-3}$ | 48.4 | 72.5 |
| Shrinkage at the boil | % | 64 | 6.0 |
| Crystallinity | % | 10.8 | 39 |
| Uster - half inert | U % | 0.23 | 0.35 |
| - normal | U % | 0.66 | 0.45 |
| Dynafil tension | cN/tex | 4.1 | |
| Dynafil CV | % | 1.2 | |
| Dynafil stretching ratio | % | 70 | |

The strands from Comparative Experiment No. E1 and No. E2 were further processed in a converted Barmag stretch texturizing machine, (Type FK6-S-900) equipped with the Barmag disc unit (type 7) with polyurethane discs PU, H6, configuration 1-4-1, D/Y=1.84, heater temperatures 1 and 2=195/160° C. at a speed of 800 m/min and heater temperatures 1 and 2=210/160° C. at a speed of 1000 m/min.

The stretching ratio, determined from the ratio of the discharge speed to the intake speed, was adjusted to match the characteristic data of the strand, and is summarized in Table 6 with the characteristic data achieved for the texturized yarn as the mean of all 6 bobbins of each individual experiment.

TABLE 6

Results of the stretch texturizing of experiment no. E1–E2

| Comparative Experiment | No. | E1 | E2 | E1 |
|---|---|---|---|---|
| Speed | m/min | 800 | 800 | 1000 |
| Stretching ratio | 1: | 1.699 | 1.18 | 1.79 |
| Tension F1/F2 | cN | 29/37 | 38/37 | 32/31 |
| Elongation at break | % | 43.8 | 33.8 | 45.3 |
| Tear strength | cN/tex | 23.3 | 27.5 | 18.2 |
| Dyeing | level | 1–2 | — | 1–2 |
| Processing properties |  | + | − | 0 |

(+ = positive; 0 = limited processability; − = negative)

Comparative Experiment No. E1 corresponds to the prior art both as regards the properties of the strand and in the stretch texturizing. When the spinning speed is increased to 5000 m/min, problems arise in the stretch texturizing in the form of breakages and thread tension defects, and the stretching ratio to be used must be greatly reduced. The strength which can be achieved is also lower. The reason lies in the increased degree of crystallization of the POY strand, and is characterized by a correspondingly lower elongation at break and necking behavior in the spinning draft.

diameter of about 0.2 mm was added to the polyethylene terephthalate chips in various concentrations. For this, the additive was metered by means of a solids metering apparatus with spindle delivery of type GLD 76 (from Gericke, Rielasingen, Germany) at the desired metering rate by means of metering pipe into the stream of PET chips in the intake region of the compounding extruder.

The additive polymer was a product of Degussa AG (Hanau, Germany), type Degalan® PVPMS, corresponding to a copolymer according to the invention of the following composition:

8.8 wt. % styrene, 91.2 wt. % MMA; viscosity number VN=98.5 ccm/g

The ratio of the melt viscosities of additive to polyester according to this invention was 4.8 and the residence time of the polymer mixture in the mixing zone (7 mixing elements, as Example 5) was 8 s.

The spinning draw-off speed was adjusted to a constant speed of 5000 m/min. The polymer throughput per spinneret was 63 g/min. The die pressure was in the range from 145 to 150 bar. Table 7 contains the strand characteristic data as the mean of all 6 bobbins of each individual experiment.

In Comparative Experiment Nos. E3 and E4, the amount of additive is lower than the parameter N defined above, and is therefore so low that although there is a significant difference to non-modified yarn, the amount of additive is not sufficient to reduce the crystallinity and the necking to the required extent so that good further processing properties are ensured. In contrast, Experiment Nos. E5 to E8 are according to the invention.

TABLE 7

| | | Experiment No. | | | | | |
|---|---|---|---|---|---|---|---|
| | | E3 | E4 | E5 | E6 | E7 | E8 |
| Residence time | min | 11 | 11 | 11 | 11 | 11 | 11 |
| Number of SMX elements | | 7 | 7 | 7 | 7 | 7 | 7 |
| Spinning temperature | °C. | 290 | 290 | 290 | 290 | 290 | 290 |
| Draw-off speed | m/min | 5000 | 5000 | 5000 | 5000 | 5000 | 5000 |
| Additive concentration | wt. % | 0.12 | 0.17 | 0.41 | 0.77 | 0.97 | 1.47 |
| Spinning titer | dtex | 129.7 | 128.6 | 128.7 | 127.2 | 129.3 | 129.4 |
| Elongation at break | % | 70.4 | 73.4 | 90.3 | 118.1 | 139.9 | 167.0 |
| CV elongation at break | % | 3.1 | 3.5 | 2.5 | 2.2 | 2.5 | 2.6 |
| Tear strength | cN/tex | 34.9 | 34.7 | 30.6 | 25.6 | 22.8 | 17.0 |
| CV breaking load | % | 3.1 | 2.6 | 2.4 | 2.3 | 3.0 | 2.7 |
| Birefringence | $\times 10^{-3}$ | 86.3 | 81.4 | 72.5 | 58.1 | | 36.5 |
| Shrinkage at the boil | % | 4.7 | 7.8 | 50.8 | 60.7 | 57.3 | 61 |
| Crystallinity | % | 27 | 22.1 | | 6.3 | | 2.9 |
| Uster | | | | | | | |
| half inert | U % | — | — | 0.36 | 0.37 | 0.4 | 0.35 |
| normal | U % | — | — | 0.48 | 0.54 | 0.57 | 0.84 |
| Dynafil tension | cN/tex | — | — | 5 | 4.6 | 3.5 | 1.8 |
| Dynafil CV | % | — | — | 1.41 | 1.07 | 1.78 | 2.4 |
| Dynafil stretching ratio | % | — | — | 40 | 70 | 40 | 80 |

EXAMPLE 6

In the spinning system according to Example 5 and under the same spinning conditions, an additive polymer according to the invention with a residual water content of <1000 ppm and in the form of bead-like particles with an average bead The strands according to the invention were subjected to stretch texturizing as in Experiment No. E1 at a processing speed of 1000 m/min. The textile characteristic data are summarized in table 8 as the mean of all 6 bobbins of each individual experiment.

TABLE 8

Results of the stretch texturizing of Experiment Nos. E5–E8

| Experiment | No. | E5 | E6 | E7 | E8 |
|---|---|---|---|---|---|
| Speed | m/min | 1000 | 1000 | 1000 | 1000 |
| Stretching ratio | 1: | 1.509 | 1.72 | 1.923 | 2.170 |
| Tension F1/F2 | cN | 40/35 | 32/29 | 28/26 | 26/26 |
| Elongation at break | % | 18.1 | 21.5 | 18.3 | 17 |
| Tear strength | cN/tex | 44.2 | 45.2 | 41 | 41.2 |
| Dyeing | stage | 1–2 | 1–2 | 2 | 2 |
| Processing properties | | 0 | + | 0 | 0 |

(+ = positive; 0 = limited processability; – = negative)

The additive amount in Experiment No. E6 was most appropriate for the spinning conditions. The best properties of the stretch-texturized yarn were achieved here. It was also possible to increase the texturizing speed to 1000 m/min with positive processing properties without problems, while the comparison yarn according to the prior art from example E1 had already showed a deterioration in the processing properties when the texturizing speed was increased from 800 to 1000 m/min (tab. 6).

Good stretch texturizing results were also to be achieved in Experiment E5, E7 and E8. However, the amount of additive in these experiments is no longer in the particularly preferred range. This manifests itself in a slight but still non-critical reduction in the tear strength and elongation at break, in particular in Experiment E8, where the amount of additive deviated the most from the particularly preferred range.

EXAMPLE 7

In the metering system and spinning system according to Example 6 and under the same spinning conditions, the same additive polymer as in Example 6 was added to the polyethylene terephthalate chips, again in various concentrations.

In this case, the spinning draw-off speed was adjusted to a constant speed of 4350 m/min. The polymer throughput per spinneret was 55 g/min. The die pressure was in the range from 30 to 145 bar. Table 9 contains the strand teristic data as the mean of all 6 bobbins of each dual experiment.

TABLE 9

| Experiment | No. | E9 | E10 | E11 | E12 |
|---|---|---|---|---|---|
| Residence time | min | 13 | 13 | 13 | 13 |
| Number of SMX elements | | 7 | 7 | 7 | 7 |
| Spinning temperature | °C. | 290 | 290 | 290 | 290 |
| Draw-off speed | m/min | 4350 | 4350 | 4350 | 4350 |
| Additive concentration | wt. % | 0.14 | 0.47 | 0.75 | 0.97 |
| Spinning titer | dtex | 130.5 | 129.4 | 131.3 | 131.5 |
| Elongation at break | % | 86.4 | 115.3 | 153.4 | 176.1 |
| CV elongation at break | % | 3.7 | 2.3 | 2.0 | 3.1 |
| Tear strength | cN/tex | 31.8 | 26.7 | 22.7 | 19.7 |
| CV breaking load | % | 3.0 | 2.8 | 2.7 | 3.1 |
| Birefringence | ×10$^{-3}$ | 69.5 | 51.7 | 40 | 33 |
| Shrinkage at the boil | % | 44.8 | 59.1 | 62.2 | 63.4 |
| Crystallinity | % | 11 | 6.8 | 5 | 4.1 |
| Uster - half inert | U % | 0.49 | 0.46 | 0.40 | 0.44 |
| - normal | U % | 0.60 | 0.60 | 0.56 | 0.67 |
| Dynafil tension | cN/tex | 5.5 | 4.6 | 2.7 | 1.8 |
| Dynafil CV | % | 1.0 | 1.0 | 2.1 | 3.0 |
| Dynafil stretching ratio | % | 40 | 70 | 80 | 80 |

The strands were subjected to stretch texturizing as in Experiment E1 at a processing speed of 1000 m/min. The textile characteristic data are summarized in Table 10 as the mean of all 6 bobbins of each individual experiment.

In Experiment E10, the additive concentration was particularly appropriate for the spinning speed, so that firstly particularly preferred properties of the strand resulted, and secondly the best yarn properties and the best processing properties were also achieved in the stretch texturizing.

Stretch-texturized yarns of good quality were also produced in Experiments E11 and E12. In Experiment E11, the amount of additive metered in is no longer in the particularly preferred range. As a result, the elongation at break of the strand also lies outside the preferred range, and in comparison with Experiment E10, a slight reduction in the tear strength and elongation at break of the stretch-texturized yarn can be seen. This trend continues in Experiment E12, where the amount of additive is also outside the preferred range of addition.

TABLE 10

Results of the stretch texturizing of Experiment Nos. E10–E12

| Experiment | No. | E10 | E11 | E12 |
|---|---|---|---|---|
| Speed | m/min | 1000 | 1000 | 1000 |
| Stretching ratio | 1: | 1.73 | 1.76 | 1.76 |
| Tension F1/F2 | cN | 35/21 | 29/26 | 25/25 |
| Elongation at break | % | 20.6 | 17.2 | 16.5 |
| Tear strength | cN/tex | 45.5 | 41 | 36.6 |
| Dyeing | stage | 1–2 | 2 | 2 |
| Processing properties | | + | 0 | 0 |

+ = positive; 0 = limited processability; – = negative)

EXAMPLE 8

In the metering and spinning system according to Example 6 and under otherwise the same conditions, the spinning speed was varied between 3200 m/min and 6000 m/min. The amount of additive metered in was adjusted here such that elongations at break of between 115% and 133% resulted in the POY yarn.

Table 11 contains the strand characteristic data as the mean of all 6 bobbins of each individual experiment. For comparison, the data of Experiment No. E1 contained in Table 5 are listed again.

TABLE 11

| Experiment | No. | E1 | E13 | E10 | E6 | E14 |
|---|---|---|---|---|---|---|
| Residence time | min | 15 | 14 | 13 | 11 | 9 |
| Polymer throughput per spinneret | g/min | 41.4 | 48 | 55 | 63 | 75 |
| Spinning temperature | °C. | 290 | 290 | 290 | 290 | 290 |
| Draw-off speed | m/min | 3200 | 3800 | 4350 | 5000 | 6000 |
| Additive concentration | wt. % | 0 | 0.3 | 0.47 | 0.77 | 1.18 |
| Spinning titer | dtex | 130 | 128.6 | 129.4 | 127.7 | 129.5 |

TABLE 11-continued

| Experiment | No. | E1 | E13 | E10 | E6 | E14 |
|---|---|---|---|---|---|---|
| Elongation at break | % | 117.3 | 132.5 | 115.3 | 118.1 | 117.3 |
| CV elongation at break | % | 2.3 | 1.8 | 2.3 | 2.2 | 2.5 |
| Tear strength | cN/tex | 25.3 | 25.4 | 26.7 | 25.6 | 24.7 |
| CV breaking load | % | 2.6 | 2.4 | 2.8 | 2.3 | 2.8 |
| Birefringence | $\times 10^{-3}$ | 48.4 | 45.2 | 51.7 | 58.1 | 63.6 |
| Shrinkage at the boil | % | 64 | 60.4 | 59.1 | 60.7 | — |
| Crystallinity | % | 10.8 | 4.9 | 6.8 | 6.3 | 4.0 |
| Uster - half inert | U % | 0.23 | 0.33 | 0.46 | 0.37 | 0.42 |
| - normal | U % | 0.66 | 0.48 | 0.60 | 0.54 | 0.61 |
| Dynafil tension | cN/tex | 4.1 | 4.4 | 4.6 | 4.6 | |
| Dynafil CV | % | 1.29 | 0.97 | 0.97 | 1.07 | |
| Dynafil stretching ratio | % | 70 | 80 | 70 | 70 | |

The strands were subjected to stretch texturizing as in Example 5 at a processing speed of 1000 m/min. The textile characteristic data are summarized in Table 12 as the mean of all 6 bobbins of each individual experiment.

TABLE 12

Results of the stretch texturizing of Experiment Nos. E1, E6, E10, E13, E14

| Experiment | No. | E1 | E13 | E10 | E6 | E14 |
|---|---|---|---|---|---|---|
| Speed | m/min | 1000 | 1000 | 1000 | 1000 | 1000 |
| Stretching ratio | 1: | 1.79 | 1.86 | 1.73 | 1.72 | 1.72 |
| Tension F1/F2 | cN | 32/31 | 31/28 | 35/21 | 32/29 | 31/28 |
| Elongation at break | % | 19.2 | 18.6 | 20.6 | 21.5 | 20.1 |
| Tear strength | cN/tex | 45.3 | 44.7 | 45.5 | 45.2 | 43.8 |
| Dyeing | level | 1–2 | 1–2 | 1–2 | 1–2 | 1–2 |
| Processing properties | | 0 | + | + | + | + |

(+ = positive; 0 = limited processability; – = negative)

In all the experiments according to this invention, the amount of additive added was ideally appropriate for the spinning speed. Strands with preferred properties which also gave outstanding results in stretch texturizing resulted.

EXAMPLE 9

The spinning system according to Example 2 was modified to the extent that the number of static mixers used for mixing in the additive was reduced from 15 to 9 and 3 respectively, corresponding to residence times of 44, 26 and 9 s. The same spinning conditions were otherwise maintained. SEM investigations were carried out on pellet samples of the modified polyester emerging from the spinneret, to evaluate the distribution of the additive. The result is summarized in Table 13, together with the elongation at break of the resulting POY yarn.

If the additive is mixed in inadequately (Experiment M1), its effectiveness—recognizable by the decreasing elongation at break—is reduced considerably. The reason for the reduced effectiveness of the additive is the increasing content of additive particles of >1000 nm diameter and the poorer distribution over the yarn cross-section. This is visible in SEM photographs and in graph plots of the particle size against the number of particles.

TABLE 13

Influence of the mixer design (nominal width DN 15)

| Experiment | No. | M1 | M2 | M3 |
|---|---|---|---|---|
| Elongation at break POY | % | 77 | 109.2 | 116.2 |
| Number of mixing elements | | 3 | 9 | 15 |
| Average particle diameter | nm | 0.22 | 0.21 | 0.19 |
| Content of particles >1000 nm | % | 1.5 | 0.5 | 0 |

EXAMPLE 10

Preparation Examples for Copolymers

1. A mixture of 4750 g completely desalinated water and 118 g Degapas® 8105 S was heated to 40° C. in a 10 l polymerization vessel equipped with a stirrer, reflux condenser and thermometer. 4750 g of a mixture of 86.2 parts by weight methyl methacrylate (MMA), 8.8 parts by weight styrene, 5 parts by weight cyclohexylmaleimide, 0.14 part by weight 2-ethylhexyl thioglycollate, 0.09 part by weight t-dodecylmercaptan, 0.05 part by weight stearic acid and 0.25 part by weight dilauroyl peroxide were then added, while stirring. The batch was polymerized at 80° C. for 165 minutes and at 90° C. for 60 minutes and then cooled to room temperature. The polymer beads were filtered off, washed out thoroughly with completely desalinated water and dried at 80° C. in a fluidized bed drier.

4710 g of clear polymer beads with a viscosity number of 99.6 cc/g were obtained.

2. A mixture of 2400 g completely desalinated water and 46 g of a 6 per cent aqueous solution of a methacrylic acid copolymer was heated to 40° C. in a 5 l polymerization vessel equipped with a stirrer, reflux condenser and thermometer. 2400 g of a mixture of 90.65 parts by weight methyl methacrylate (MMA), 8.75 parts by weight styrene, 0.15 part by weight 2-ethylhexyl thioglycolate, 0.1 part by weight t-dodecylmercaptan, 0.05 part by weight stearic acid and 0.3 part by weight dilauroyl peroxide were then added, while stirring. The batch was polymerized at 80° C. for 150 minutes and at 90° C. for 30 minutes and then cooled to room temperature. The polymer beads were filtered off, washed out thoroughly with completely desalinated water and dried at 80° C. in a fluidized bed drier.

2283 g clear polymer beads with a viscosity number of 98.5 cc/g were obtained.

3. A mixture of 2400 g completely desalinated water and 46 g of a 6 per cent aqueous solution of a methacrylic acid polymer was heated to 40° C. in a 5 l polymerization vessel equipped with a stirrer, reflux condenser and thermometer. 2400 g of a mixture of 90.715 parts by weight methyl methacrylate (MMA), 8.75 parts by weight styrene, 0.115 part by weight 2-ethylhexyl thioglycolate, 0.07 part by weight t-dodecylmercaptan, 0.05 part by weight stearic acid and 0.3 part by weight dilauroyl peroxide were then added, while stirring. The batch was polymerized at 80° C. for 150 minutes and at 90° C. for 60 minutes and then cooled to room temperature. The polymer beads were filtered off, washed out thoroughly with completely desalinated water and dried at 80° C. in a fluidized bed drier. 2299 g clear polymer beads with a viscosity number of 118.4 cc/g were obtained.

What is claimed is:

1. A process for production of preoriented filaments from polyester-based polymer mixtures prepared from a melt, comprising:
adding an amorphous, thermoplastically processable copolymer having a glass transition temperature of more than 100° C., by spinning molten polymer mixtures with a draw-off speed v of at least 2,500 m/min, wherein:
a ratio of melt viscosity of the copolymer to melt viscosity of the polyester is 1:1 to 10:1, in that the amount of copolymer added to the polyester corresponds to at least 0.05 wt. % and not more than an amount M, where M is given by the formula $$M = \left[\frac{1}{1600} \cdot v\left(\frac{m}{min}\right) - 0.8\right] [\text{wt. \%}].$$

2. The process according to claim 1, wherein:
the ratio of the melt viscosity of the copolymer to the melt viscosity of the polyester is 1.4:1 to 8:1.

3. The process according to claim 1, wherein:
the ratio of the melt viscosity of the copolymer to the melt viscosity of the polyester is 1.7:1 to 6.5:1.

4. The process according to claim 1, wherein:
the copolymer comprises the following monomer units:
A=acrylic acid, methacrylic acid or $CH_2$=CR—COOR', wherein R is an H atom or a $CH_3$ group and R' is a $C_{1-15}$-alkyl radical or a $C_{5-12}$-cycloalkyl radical or a $C_{6-14}$-aryl radical,
B=styrene or $C_{1-3}$-alkyl-substituted styrenes,
wherein the copolymer comprises 60 to 98 wt. % A and 2 to 40 wt. % B (total=100 wt. %).

5. The process according to claim 4, wherein:
the copolymer comprises 83 to 98 wt. % A and 2 to 17 wt. % B (total=100 wt. %).

6. The process according to claim 4, wherein: the copolymer comprises 90 to 98 wt. % A and 2 to 10 wt. % B (total=100 wt. %).

7. The process according to claim 1, wherein:
the copolymer comprises the following monomer units:
C=styrene or $C_{1-3}$-alkyl-substituted styrenes,
D=one or more monomers of the formula I, II or III

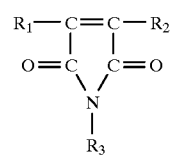

(I)

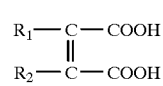

(II)

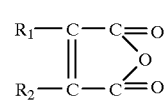

(III)

wherein $R_1$, $R_2$ and $R_3$ are each an H atom or a $C_{1-15}$-alkyl radical or a $C_{5-12}$-cycloalkyl radical or a $C_{6-14}$-aryl radical, and wherein the copolymer comprises 15 to 95 wt. % C and 5 to 85 wt. % D, the total of C and D together being 100%.

8. The process according to claim 7, wherein:
the copolymer comprises 50 to 90 wt. % C and 10 to 50 wt. % D, the total of C and D together being 100%.

9. The process according to claim 7, wherein:
the copolymer comprises 70 to 85 wt. % C and 30 to 15 wt. % D, the total of C and D together giving 100%.

10. The process according to claim 1, wherein:
the copolymer comprises the following monomer units:
E=acrylic acid, methacrylic acid or $CH_2$=CR—COOR', wherein R is an H atom or a $CH_3$ group and R' is a $C_{1-15}$-alkyl radical or a $C_{5-12}$-cycloalkyl radical or a $C_{6-14}$-aryl radical,
F=styrene or $C_{1-3}$-alkyl-substituted styrenes,
G=one or more monomers of the formula I, II or III

(I)

(II)

(III)

wherein $R_1$, $R_2$ and $R_3$ are each an H atom or a $C_{1-15}$-alkyl radical or a $C_{5-12}$-cycloalkyl radical or a $C_{6-14}$-aryl radical,
H=one or more ethylenically unsaturated monomers, which is copolymerized with E and/or with F and/or with G, selected from the group consisting of α-methylstyrene, vinyl acetate, acrylic acid esters, methacrylic acid esters which differ from E, vinyl chloride, vinylidene chloride, halogen-substituted styrenes, vinyl ethers, isopropenyl ethers and dienes,
wherein the copolymer comprises 30 to 99 wt. % E, 0 to 50 wt. % F, >0 to 50 wt. % G and 0 to 50 wt. % H, the total of E, F, G and H together being 100%.

11. The process according to claim 10, wherein:
the copolymer comprises 45 to 97 wt. % E, 0 to 30 wt. % F, 3 to 40 wt. % G and 0 to 30 wt. % H, the total of E, F, G and H together being 100%.

12. The process according to claim 10, wherein: the copolymer comprises 60 to 94 wt. % E, 0 to 20 wt. % F, 6 to 30 wt. % G and 0 to 20 wt. % H, the total of E, F, G and H together being 100%.

13. The process according to claim 1, wherein:
the copolymer comprises additives in an amount, in each case, of <1 wt. %, for improving the polymer properties.

14. The process according to claim 1, wherein:
the polymer mixture is prepared, after melting of the polyester and copolymer, in a static mixer, a diameter of which is chosen such that shear rate is between 16 and 128 $s^{-1}$ and a product of the shear rate and an 0.8th power of residence time in seconds is greater than 250.

15. The process according to claim 1, wherein:
the mixture is subjected to shear treatment during mixing such that an average particle size of the copolymer immediately after discharge from a spinneret is not more than 400 nm, that less than 1% of copolymer particles contained in the mixture have a particle size of >1 μm, and that the length/diameter ratio of the copolymer particles is >2, the copolymer particles being present in a polymer matrix in the filaments in a form of fibrils after spinning draft, a length/diameter ratio of the fibrils being >50.

16. The process according to claim 1, wherein:

the polyester is a thermoplastically processable polyester comprising polyethylene terephthalate, polyethylene naphthalate, polypropylene terephthalate or polybutylene terephthalate, wherein the polyester optionally comprises at least one member selected from the group consisting of up to 15 mol % of a comonomer and up to 0.5 wt. % of a polyfunctional branching component.

17. The process according to claim 1, wherein:

the filaments are initially wound up after spinning and are then subjected to stretch texturizing, a stretching ratio being between 1:1.35 and 1:2.20.

18. The process according to claim 17, wherein:

texturized filaments with a capillary titer of more than 2 dtex are produced at a processing speed of at least 750 m/min and texturized filaments with a capillary titer of less than 2 dtex are produced at a processing speed of at least 400 m/min.

19. Preoriented filaments produced according to the process of claim 1, wherein:

the filaments have an elongation at break of 85 to 180%, a tear strength of at least 17 cN/tex, a shrinkage at the boil of 32 to 69%, a birefringence of 0.030 to 0.075 and a crystallinity of less than 20%.

20. Preoriented filaments according to claim 19, having an elongation at break of 109 to 146%, a tear strength of at least 22 cN/tex and a normal Uster of <0.7%.

21. Texturized filaments produced from the preoriented filaments according to claim 19.

* * * * *

UNITED STATES PATENT AND TRADEMARK OFFICE
CERTIFICATE OF CORRECTION

PATENT NO. : 5,962,131
DATED : October 5, 1999
INVENTOR(S) : Schwind, et. al.

It is certified that error appears in the above-indentified patent and that said Letters Patent is hereby corrected as shown below:

Please insert the following additional Assignee on the face of the above-identified patent.

[73] Assignee: Degussa Aktiengesellschaft, Frankfurt, Germany
and --Zimmer Aktiengesellschaft, Frankfurt, Germany--

Signed and Sealed this

First Day of May, 2001

Attest:

NICHOLAS P. GODICI

*Attesting Officer*    *Acting Director of the United States Patent and Trademark Office*